Oct. 14, 1941.　　　T. L. ROBINSON　　　2,259,325

ROLLER BEARING

Original Filed Dec. 23, 1939

INVENTOR
Thomas L. Robinson.
BY
Everett E. Wright
ATTORNEY

Patented Oct. 14, 1941

2,259,325

UNITED STATES PATENT OFFICE 2,259,325

ROLLER BEARING

Thomas L. Robinson, Grosse Pointe, Mich.

Original application December 23, 1939, Serial No. 310,684. Divided and this application March 19, 1941, Serial No. 384,049

7 Claims. (Cl. 308—216)

This invention relates to roller bearings of the cylindrical roller or needle type.

This application for patent is a division of an application for patent by the same inventor filed December 23, 1939, Serial No. 310,684.

Roller bearings of the prior art generally bind or tend to bind when in service from misalignment and/or inaccuracy of manufacture, and, when in use misaligned and/or imperfect roller bearings develop friction between the rollers and the inner race members and/or between the rollers and the outer race members. The raceways of the inner and outer race members are generally hardened during manufacture to such a degree, that, when binding develops from misalignment and/or inaccuracy of manufacture, long periods of operation are required to wear the bearing to normal operating freeness.

In high-speed installations or service, the wearing-in of roller bearings often causes overheating of the bearings which expands the various elements thereof to such a degree that either freezing occurs or irreparable damage is done to the raceways or to the rollers thereof.

Due to misalignment or inaccuracy of manufacture, portions of the hardened annular edges of the inner and outer race members often chip or spall off near the ends of the rollers due to extremely heavy concentrated loads applied to the race members at or near the ends of the rollers. Chipping or spalling off of the race members is more apt to occur in roller bearings which are assembled without sufficient clearances between the rollers and the race members particularly when such roller bearings are run under heavy loads with the outer and inner race members in slight misalignment caused by shaft and pillow block misalignment or by bearing support deflection under conditions of heavy loading.

With the foregoing in view, the primary object of the invention is to provide an improved cylindrical roller or needle-type roller bearing which will accommodate itself to reasonable inaccuracies in manufacture and/or misalignment in installation with relatively short wearing-in periods and without the hazard of the chipping or spalling off of the annular edges of the inner and outer race members under abnormal stresses to which the race members of the roller bearings are subjected when running under conditions of slight inaccuracies of manufacture and assembly and/or misalignment in their installation.

Another object of the invention is to provide a roller bearing having zone hardened inner and outer race members which are relatively softer at the sides of the raceways than at the center thereof which permit plastic deformation of the race members into convex surfaced raceways during the "wearing-in" period of the bearing whereby to reduce friction and the area of contact between the race members and the rollers to a minimum.

Another object of the invention is to provide a roller bearing having the center of the raceways of the inner and outer race members relatively harder than the outer sides of the said raceways whereby to permit the bearing to wear its roller paths slightly convex without chipping or spalling off of the raceways near the outer annular edges thereof and without damage to the rollers thereof.

Another object of the invention is to provide a novel roller bearing having the ability to wear itself without damage into free running condition in cases where there has been a slight misalignment of the race members or where there has been inaccuracy in the manufacture of the component parts thereof.

Other objects of the invention will become apparent by reference to the following detailed description taken in connection with the accompanying drawing, in which.

Figure 1:
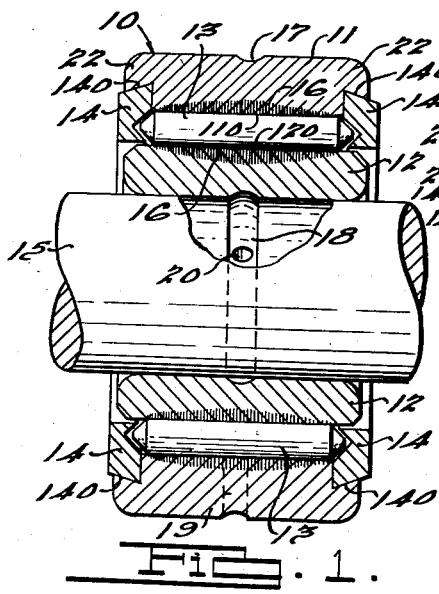
Fig. 1 is a cross sectional view of a roller bearing embodying the invention having a shaft mounted through the inner race member thereof.
Figure 2:
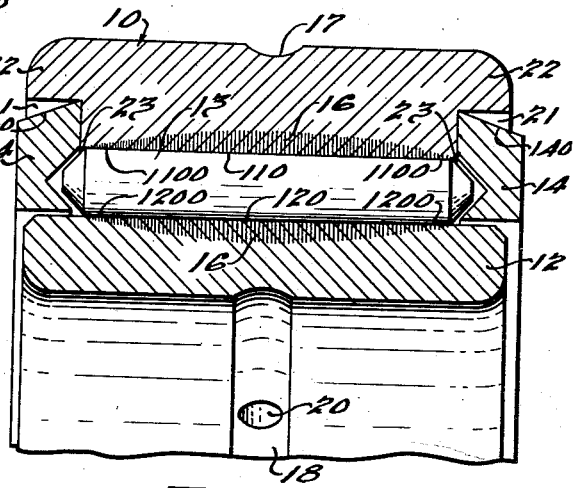
Fig. 2 is an enlarged fragmentary view of the roller bearing disclosed in Fig. 1 showing the zone hardening of the outer and inner race member thereof.
Figure 3:
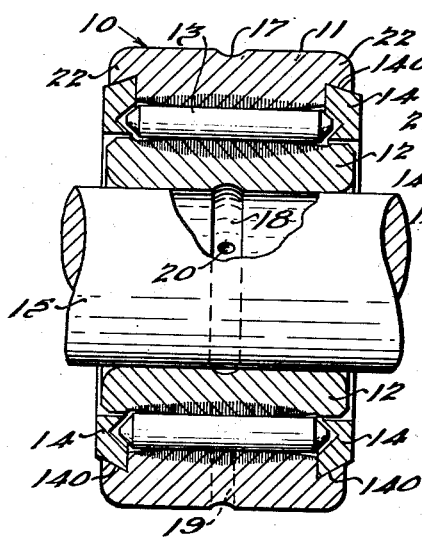
Fig. 3 is a cross sectional view of the roller bearing disclosed in Fig. 1 after it has been in use under conditions of slight misalignment or inaccuracy of manufacture.

Referring now to the drawing wherein like numerals refer to like and corresponding parts throughout the several views, and with particular reference to Figs. 1 and 2, the roller bearing generally designated by the numeral 10 is composed of an outer race member 11, an innner race member 12, and a plurality of rollers 13 disposed between said race members 11 and 12, the said rollers 13 being retained in operating relationship with respect to the raceway 110 of the outer race member 11 by means of retainer rings 14. The bearing 10 is indicated in Fig. 1 with a shaft 15 fitted within the inner race member 12. The raceway 110 of the outer race member 11 and the raceway 120 of the inner race member 12 are zone hardened at 16 preferably as diagrammatically indicated by shading disposed normal to the raceways 110 and 120 throughout the drawing; the deeper the shading, the greater degree of hardness and the deeper the hardening of the raceway.

The outer and inner race members 11 and 12 are preferably provided with oil grooves 17 and 18 respectively and each race member is provided with an oil bore 19 and 20 respectively communicating between the said oil grooves 17 and 18 and the raceways 110 and 120. The outer race member 11 is provided with counterbores 21 at the side thereof to accommodate the retainer rings 14 which have an outer sloping periphery 140.

After the zone hardening the raceway 110 of the outer race member 11, the rollers 13 are assembled therein and a retainer ring 14 is placed in the counterbores 21 at each side of the said race member 11. The outer annular rim 22 of each side of the outer race member 11 is then peened, pressed or rolled over the sloping periphery 140 of the retainer rings 14 whereby to hold the retainer rings 14 and the rollers 13 in the desired assembled relationship with respect to the outer race member 11. After the outer race member 11 is completely assembled as hereinbefore described, the inner race member 12 is telescoped therewithin; the raceway 120 of the inner race member 12 having been zone hardened at 16 similar to the zone hardening of the raceway 110 of the outer race member 11.

The zone hardening of the outer and inner race members 11 and 12 may be accomplished electrically by the induction method or by any other method known in the art or later discovered, it being essential that the intensity of the hardening of the said outer and inner race members 11 and 12 be substantially as diagrammatically indicated by the shading 16 throughout the drawing; the deeper the shading 16 the harder and deeper the hardening of the said race members. By reference to Fig. 2, it will be noted that the sides of the raceway 110 and 1100 and the sides of the raceway 120 at 1200 are relatively softer than the central portion of the raceways 110 and 120, and that the annular corners 23 are substantially unhardened, all of which contributes to accomplish the beneficial results herein set forth.

Inasmuch as no claim is made herein to the particular method which is employed to harden the raceways 110 of the outer race member 11 and the raceway 120 of the inner race member 12, any method of hardening may be employed to produce the novel bearing herein disclosed having the sides of the raceways softer than the center thereof. It is also preferable and essential that the rollers 13 of roller bearings embodying the invention be slightly harder than or at least as hard as the thickness of the central portion of the raceways 110 and 120.

Figure 4:
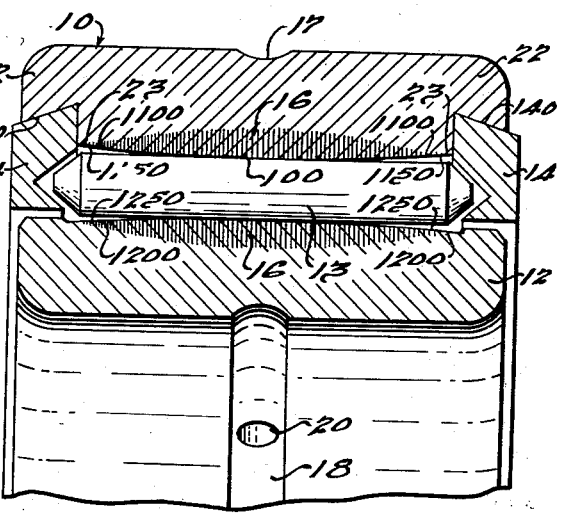
Fig. 4 is an enlarged fragmentary cross sectional view of the roller bearing showing in detail the convex raceways created after the bearing has been run-in under conditions of slight misalignment or inaccuracy of manufacture.

When a bearing 10 has its raceways 110 and 120 of its race members 11 and 12 hardened as hereinbefore described and the said bearing 10, which is designed to run with its roller in alignment is caused to run with its rollers on a skew by misalignment in installation of the bearing or by inaccuracy of manufacture, the raceways 110 and 120 tend to bind and excessive pressure is developed against the raceways 110 and 120 near the sides thereof. Inasmuch as the sides 1100 and 1200 of the raceways 110 and 120 respectively are relatively soft, the bearing 10 readily "wears-in" at 1150 and 1250 which causes the raceways 110 and 120 to assume a convex cross section as best shown in Fig. 4. Thus the usual long and destructive "wearing-in" period is avoided by employing the invention.

Also, because of the fact that the annular corners 23 of the bearing 10 are not hardened to any particular degree, the frequent failure of a bearing, which often begins by the corners 23 of the outer raceway 12 spalling or chipping off under heavy loads or when operating under conditions of misalignment, is generally avoided.

The assembly of bearings is simplified by the instant invention inasmuch as the outer annular rims 22 of the outer race member 11 remain soft and ductile after the raceway 110 of the outer race member 11 is hardened and are capable of being rolled, peened or pressed over the sloping periphery 140 of the retainer rings 14.

A bearing 10 hardened as herein described with relatively softer sides to its raceways than the center thereof readily forms itself during "wearing-in" into a bearing having convex raceways which, although known to be extremely desirable, was not heretofore economically possible in roller bearings manufactured in large production for sale in highly competitive markets.

Therefore, the novel roller bearing herein disclosed has superior "wearing-in" qualities and has raceways that will not spall or chip off under heavy loading or while operating under conditions of misalignment and will shape itself during use into a bearing having desirable convex raceways, thus producing a more efficient and effective roller bearing as it wears as compared to the usual roller bearing which becomes less effective as a result of wear.

Rather than let the bearings wear-in after being placed in service, they may be run on suitable jigs or running-in blocks at the factory with the raceways positioned slightly out of alignment. Thus, a highly desirable bearing having convex surfaced raceways can be manufactured at a slight expense over the normal cost of producing like roller bearings having parallel raceways and at a fraction of the expense of machining or grinding the raceways to a convex surface. In the less expensive roller bearings the "running-in" would take place in service rather than at the factory.

Although but one embodiment of the invention has been disclosed and described in detail, it is to be understood that many changes in the size, shape, arrangement and detail of the various parts thereof may be made without departing from the spirit of the invention, and it is not intended to limit the scope of the invention other than by the terms of the appended claims.

I claim:

1. A roller bearing of the class described in which the race members are hardened at their raceways harder at the center of the said raceways than at the sides thereof whereby to admit of plastic deformation of said raceways into convex surfaces when the bearing is run under conditions of inaccuracy of manufacture or misalignment of the raceways thereof.

2. A roller bearing of the class described in which the race members are hardened at their raceways harder at the center of the said raceways than at the sides thereof whereby to materially reduce "wearing-in" time required and friction developed when the bearing is run under conditions of inaccuracy of manufacture or misalignment of the raceways thereof.

3. A roller bearing of the class described in which the race members are hardened only at their raceways and then harder at the center of the said raceways than at the sides thereof whereby to admit of plastic deformation of said raceways into convex surfaces when the bearing is run under conditions of inaccuracy of manufacture or misalignment of the raceways thereof.

4. A roller bearing of the class described in which the race members are hardened only at their raceways and then harder at the center of the said raceways than at the sides thereof whereby to materially reduce "wearing-in" time required and friction developed when the bearing is run under conditions of inaccuracy of manufacture or misalignment of the raceways thereof.

5. A roller bearing of the class described in which the race members are hardened at their raceways harder at the center of the said raceways than at the sides thereof and left substantially unhardened at the annular corners of the said raceways whereby to admit of plastic deformation of said raceways into convex surfaces when the bearing is run under conditions of inaccuracy of manufacture or misalignment of the raceways thereof and to prevent spalling and chipping of the said raceways at the said annular corners thereof when running under heavy loads.

6. A roller bearing of the class described in which the race members are hardened at their raceways harder at the center of the said raceways than at the sides thereof and left substantially unhardened at the annular corners of the said raceways whereby to materially reduce "wearing-in" time required and friction developed when the bearing is run under conditions of inaccuracy of manufacture or misalignment of the raceways thereof and to prevent spalling and chipping of the said raceways at the said annular corners thereof when running under heavy loads.

7. In a roller bearing of the class described, an outer race member hardened to a greater degree of hardness at the center of the raceway thereof than at the sides of the said raceway thereof and axially counterbored at both ends to receive retainer rings leaving unhardened annular outer rims at the said ends of the said race member, a retainer ring having a sloping outer periphery positioned in the said counterbore, the said annular outer rims being formed over the said retainer rings whereby to hold the retainer rings and rollers guided thereby in operating relationship with respect to the said outer race member.

THOMAS L. ROBINSON.